(12) United States Patent
Joo

(10) Patent No.: US 10,082,930 B2
(45) Date of Patent: Sep. 25, 2018

(54) METHOD AND APPARATUS FOR PROVIDING USER INTERFACE IN PORTABLE TERMINAL

(75) Inventor: Han Jo Joo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2025 days.

(21) Appl. No.: 13/316,959

(22) Filed: Dec. 12, 2011

(65) Prior Publication Data

US 2012/0174033 A1    Jul. 5, 2012

(30) Foreign Application Priority Data

Jan. 5, 2011  (KR) .......................... 10-2011-0001049

(51) Int. Cl.
| | |
|---|---|
| G06F 3/0482 | (2013.01) |
| G06F 3/0485 | (2013.01) |
| G06F 3/0489 | (2013.01) |
| G06F 3/023 | (2006.01) |
| H04M 1/725 | (2006.01) |

(52) U.S. Cl.
CPC .......... *G06F 3/0482* (2013.01); *G06F 3/0485* (2013.01); *G06F 3/0236* (2013.01); *G06F 3/04892* (2013.01); *H04M 1/72583* (2013.01)

(58) Field of Classification Search
None
See application file for complete search history.

(56) References Cited

U.S. PATENT DOCUMENTS

| | | | | |
|---|---|---|---|---|
| 5,124,942 A | * | 6/1992 | Nielsen ..................... H02J 7/35 |
| | | | | 715/713 |
| 6,459,422 B1 | * | 10/2002 | Kirk ....................... G06F 3/0236 |
| | | | | 345/168 |
| 6,734,909 B1 | * | 5/2004 | Terane ................. H04N 1/00442 |
| | | | | 348/333.05 |
| 2002/0070979 A1 | | 6/2002 | Hong | |
| 2004/0001105 A1 | * | 1/2004 | Chew ................. H04M 1/72583 |
| | | | | 715/817 |

(Continued)

FOREIGN PATENT DOCUMENTS

| | | |
|---|---|---|
| CN | 1359057 A | 7/2002 |
| CN | 1776587 A | 5/2006 |

(Continued)

OTHER PUBLICATIONS

Bing search q=move+grid+menu&src=IE-SearchBox&FO Nov. 16, 2015.*
Bing search q=scroll%20grid%20menu&qs=n&form=QBR Nov. 16, 2015.*

*Primary Examiner* — Jeffrey A Gaffin
*Assistant Examiner* — John M Heffington
(74) *Attorney, Agent, or Firm* — Jefferson IP Law, LLP

(57) ABSTRACT

A method and an apparatus for providing a user interface in a portable terminal without a touch screen are provided. The method includes outputting one of a plurality of menu pages, each menu page including a plurality of icons respectively linked to a specific function and arranged in multiple columns and rows, determining whether a key signal requesting movement is input, determining whether the input key signal exceeds a preset reference value when the key signal is input, and moving another of the plurality of menu pages when the input key signal exceeds the preset reference value, and moving a focus on the output menu page when the input key signal does not exceed the preset reference value.

21 Claims, 3 Drawing Sheets

(56) References Cited

U.S. PATENT DOCUMENTS

| | | | |
|---|---|---|---|
| 2005/0119031 A1* | 6/2005 | Spalink | G06F 3/0482 455/566 |
| 2006/0107237 A1 | 5/2006 | Kim | |
| 2006/0161861 A1 | 7/2006 | Holecek et al. | |
| 2006/0282858 A1* | 12/2006 | Csicsatka | G06F 3/0485 725/52 |
| 2007/0176910 A1* | 8/2007 | Simek | G06F 1/3259 345/184 |
| 2007/0247446 A1* | 10/2007 | Orsley | G06F 3/0362 345/184 |
| 2008/0174561 A1* | 7/2008 | Kim | G06F 3/04883 345/173 |
| 2009/0073271 A1* | 3/2009 | Grenlund | H04N 5/2251 348/211.8 |
| 2009/0128507 A1 | 5/2009 | Hoshino et al. | |
| 2009/0178008 A1 | 7/2009 | Herz et al. | |
| 2009/0319896 A1* | 12/2009 | Green | G06F 3/0481 715/708 |
| 2010/0022276 A1 | 1/2010 | Park et al. | |
| 2010/0088639 A1* | 4/2010 | Yach | G06F 1/1626 715/825 |
| 2011/0265035 A1* | 10/2011 | Lepage | G06F 3/0482 715/810 |
| 2012/0166991 A1* | 6/2012 | Cramer | G06F 3/0483 715/771 |

FOREIGN PATENT DOCUMENTS

| | | | | |
|---|---|---|---|---|
| CN | 101308443 A | 11/2008 | | |
| CN | 101727282 A | 6/2010 | | |
| CN | 101783905 A | 7/2010 | | |
| CN | 101796478 A | 8/2010 | | |
| CN | 101901112 A | 12/2010 | | |
| GB | 2355145 A | * | 4/2001 | H04M 1/72522 |
| JP | 2008-305274 A | 12/2008 | | |
| KR | 10-2007-0005832 A | 1/2007 | | |
| KR | 10-2008-0064512 A | 7/2008 | | |

* cited by examiner

METHOD AND APPARATUS FOR PROVIDING USER INTERFACE IN PORTABLE TERMINAL

PRIORITY

This application claims the benefit under 35 U.S.C. § 119(a) of a Korean patent application filed on Jan. 5, 2011 in the Korean Intellectual Property Office and assigned Serial No. 10-2011-0001049, the entire disclosure of which is hereby incorporated by reference.

BACKGROUND OF THE INVENTION

1. Field of the Invention

The present invention relates to a method and an apparatus for providing a user interface in a portable terminal. More particularly, the present invention relates to a method for providing a user interface capable of providing menus of a page scheme in a portable terminal without a touch screen and an apparatus thereof.

2. Description of the Related Art

In general, various advanced functions are now being included in a portable terminal, such as a portable phone, so that it may provide a user with increased convenience. That is, the portable terminal may execute various advanced functions such as a short message transmission/reception function, a digital broadcasting receiving function, and a music playback function as well as a general voice calling function. To control and execute the foregoing various functions, the portable terminal includes an input device. The input device used for the portable terminal may be one of various types such as a button type keypad, a touch screen, a touch pad, a ball joystick, an optical joystick, a wheel key, and a track ball. The input device transmits user commands to a controller, such as a Central Processing Unit (CPU), according to a previously defined operation scheme.

The portable terminal further provides menus that allow a user to rapidly execute the various functions or to change a setting value (e.g., bell sound, idle screen, screen brightness, etc.) of a certain function. Typically, a portable terminal with a touch screen provides menus in a page scheme where icons are arranged in multiple columns and rows. Since the portable terminal cannot display all of its menus included therein on a single page, it provides the menus on a plurality of pages. The page scheme provides menus included in the portable terminal in an intuitive manner to improve the convenience of a user. However, a portable terminal that does not include a touch screen may not provide menus in the page scheme. That is why a first arrow key signal for moving a page and a second arrow key for selecting one of a plurality of menus arranged on one page must be input through an input unit. That is, when an arrow direction is allotted to selection of menus, there is a problem of not being able to move a page. Accordingly, a conventional non-touch portable terminal cannot provide menus in a page scheme. To address the problem, additional keys for moving a page may be provided. However, it is inefficient to add key buttons for simply moving the page.

Accordingly, there is a need for an improved apparatus and method for providing a user interface in a portable terminal capable of providing menus in a page scheme in a non-touch portable terminal without adding key buttons.

SUMMARY OF THE INVENTION

Aspects of the present invention are to address at least the above-mentioned problems and/or disadvantages and to provide at least the advantages described below. Accordingly, an aspect of the present invention is to provide a method for providing a user interface in a portable terminal capable of providing menus in a page scheme in a non-touch portable terminal without adding key buttons, and an apparatus thereof.

In accordance with an aspect of the present invention, a user interface method in a portable terminal is provided. The method includes outputting one of a plurality of menu pages, each menu page including a plurality of icons respectively linked to a specific function and arranged in multiple columns and rows, determining whether a key signal requesting movement is input, determining whether the input key signal exceeds a preset reference value when the key signal is input, and moving another of the plurality of menu pages when the input key signal exceeds the preset reference value, and moving a focus on the output menu page when the input key signal does not exceed the preset reference value.

In accordance with another aspect of the present invention, an apparatus for providing a user interface in a portable terminal is provided. The apparatus includes a display unit for outputting one of a plurality of menu pages, each menu page including a plurality of icons respectively linked to a specific function and arranged in multiple columns and rows, an input unit for inputting an key signal requesting movement, and a controller for determining whether the input key signal exceeds a preset reference value when the key signal is input from the input unit, for moving to another of the plurality of menu pages when the input key signal exceeds the preset reference value, and for moving a focus on the output menu page when the input key signal does not exceed the preset reference value.

As illustrated above, a method and an apparatus for providing a user interface in a portable terminal according to an exemplary embodiment of the present invention may provide menus in a page scheme in a non-touch portable terminal. Accordingly, exemplary embodiments of the present invention may improve the convenience for a user in using the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
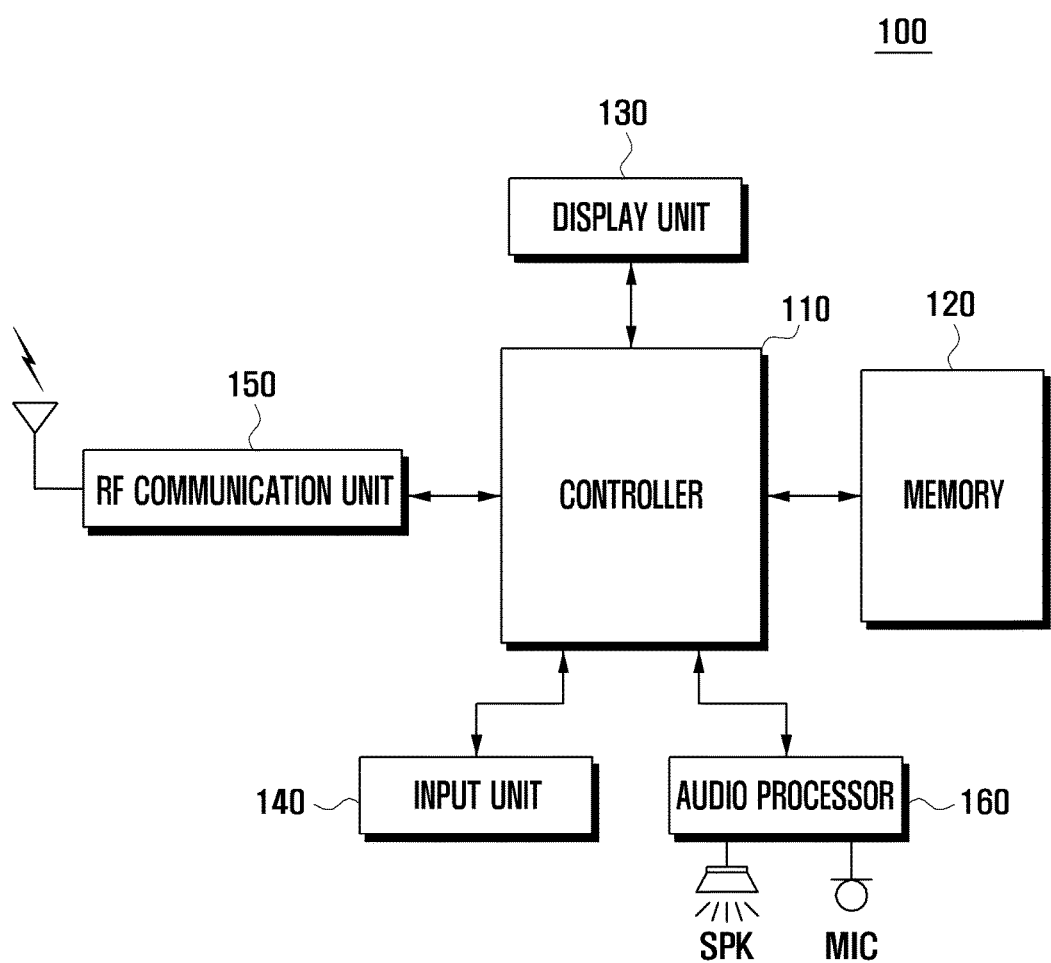
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, a portable terminal 100 may include an audio processor 160, a Radio Frequency (RF) communication unit 150, an input unit 140, a display unit 130, a memory 120, and a controller 110.

The RF communication unit 150 executes a communication function of the portable terminal 100. For example, the RF communication unit 150 forms a communication channel with a wireless network (including a base station) to perform speech communication, videophone communication, and data communication. The RF communication unit 150 may include an RF transmitter (not shown) for up-converting a frequency of a signal for transmission and amplifying the signal, and an RF receiver (not shown) for low-noise-amplifying a received signal and down-converting a frequency of the signal. When the portable terminal 100 does not provide a communication function, the RF communication unit 150 may be omitted.

The audio processor 160 may include a sound device that transmits and receives an audio signal by encoding and decoding. The audio processor 160 may include a codec and an audio amplifier. The audio processor 160 may include a microphone (MIC) and a speaker (SPK). The audio processor 160 may convert a speech signal input from the microphone into data and transmit the data to the controller 110. The audio processor 160 may convert a speech signal input from the controller 110 into an analog signal and output the analog signal through the speaker. Further, the audio processor 160 may output various audio signals (e.g., MP3 files, audio signal according to playback of moving image files, etc.) created by the portable terminal 100 through the speaker.

The display unit 130 may display screen data and input events of a user created during execution of a function of the portable terminal 100, state information such as key operation, function setting information of the portable terminal 100, and the like. Further, the display unit 130 may visually display various signals and color information output from the controller 110. More particularly, the display unit 130 may output a menu screen (referred to as 'menu page' hereinafter) of a page scheme and a plurality of menu pages may be provided. A plurality of icons, linked to specific functions for each of the menu pages, are arranged in multiple columns and rows on the menu pages. The display unit 130 may output and move a menu page or focus on a specific icon according to a movement request signal input using the input unit 140. The term focus means that an appearance of an icon is displayed in a highlighted manner such that a user may recognize an icon selected from a plurality of icons. An example of a screen of the display unit 130 and an operation thereof will be described in more detail with reference to FIG. 3. The display unit 130 may be configured by a Liquid Crystal Display (LCD), an Organic Light-Emitting Diode (OLED), an Active Matrix Organic Light-Emitting Diode (AMOLED), and the like. When the display unit 130 comprises a touch-screen (not shown), the display unit 130 can operate as an input unit 140.

The input unit 140 receives numerals or various character information, and may include input keys and function keys for setting various functions and controlling functions of the portable terminal 100. More particularly, the input unit 140 may include keys for requesting movement. For example, the user may operate the input unit 140 to move a menu page or a focus on the menu page. The keys for requesting movement may include a key pad (an arrow key or a volume key), a ball joystick, an optical joystick, a wheel key, and the like. Further, the input unit 140 may include an enter key for executing a selected (focused) menu item. The input unit 140 may be configured by one or a combination of a button type key pad, a ball joystick, an optical joystick, a wheel key, and the like.

The memory 120 may store programs necessary for executing an overall operation as well as a certain function, data created during execution of the programs, and user data. For example, the memory 120 may store an Operating System (OS) for booting the portable terminal 100 and an application program such as a music playback program, a moving image playback program, a web access program necessary, and the like for operating a function of the portable terminal 100. More particularly, the memory 120 may store a program that determines whether a key signal of the input unit 140 exceeds a reference value and moves a menu page or a focus according to whether the key signal of the input unit 140 exceeds the reference value.

Moreover, the memory 120 may store the reference value according to a type of the input unit 140. For example, when the input unit 140 inputting the key signal is a button type keypad, the reference value may be a time period of a key input. As another example, when the input unit 140 inputting the key signal is an optical joystick, a ball joystick, or a wheel key, the reference value may be a velocity. For example, the reference value may be set to a time period of one second or a velocity of 0.2 m/s.

The controller 110 may execute an overall operation control function of the portable terminal, control signal flow between respective elements in the portable terminal 100, perform a data processing function, and the like. More particularly, when a key signal is input from the input unit 140 in an output state of a menu page, the controller 110 may determine whether the key signal exceeds a reference value. When the key signal exceeds the reference value, the controller 110 may move a menu page. In this case, the controller 110 determines whether there is another menu page in a direction of the input key. When there is another menu page in the direction of the input key, the controller 110 may output a corresponding menu page on the display unit 130. When moving the menu page, the controller 110 may maintain a previous location of a focus or initialize it to a preset location. For example, when the focus is located in the second column and row of the menu page and the menu page is moved, the controller 110 may maintain the location of the focus in the second column and row of the next menu page or initialize it in the first column and row. In an exemplary implementation, when there is a menu in a previous location of the focus during movement of a menu page, the controller 110 maintains a location of the focus. Conversely, when there is no menu at the previous location of the focus, the controller 110 may initialize a location of the focus.

Conversely, when there is no menu page in the direction of the input key, the controller 110 may process an error. For example, the controller 110 may output a pop-up window indicating that there are no more menu pages on the display unit 130 in the direction of the input key or output a sound effect indicating an error through the speaker of the audio processor 160. Alternatively, the controller 110 may output an animation effect in which a final menu page is removed and returned.

When the key signal does not exceed the reference value, the controller 110 may move a current focus on a menu page displayed on the display unit 130. Further, when a signal indicating the enter key is input, the controller 110 may execute the menu upon which the focus is located.

For convenience of description, FIG. 1 shows a schematic construction of an exemplary portable terminal 100. However, the portable terminal 100 according to exemplary embodiments of the present invention is not limited to the foregoing construction. The portable terminal 100 according to exemplary embodiments of the present invention may selectively include structural elements for providing additional functions such as a camera module for capturing images or moving images, a broadcasting receiving module for receiving a broadcast, a digital sound source playback module such as an MP3 module, a near distance wireless communication module, and a proximity sensor module for proximity sensing. Since the structural elements can be variously changed according to a convergence trend of a digital device, no elements can be listed. However, the portable terminal 100 may include structural elements equivalent to the foregoing structural elements.

Figure 2:
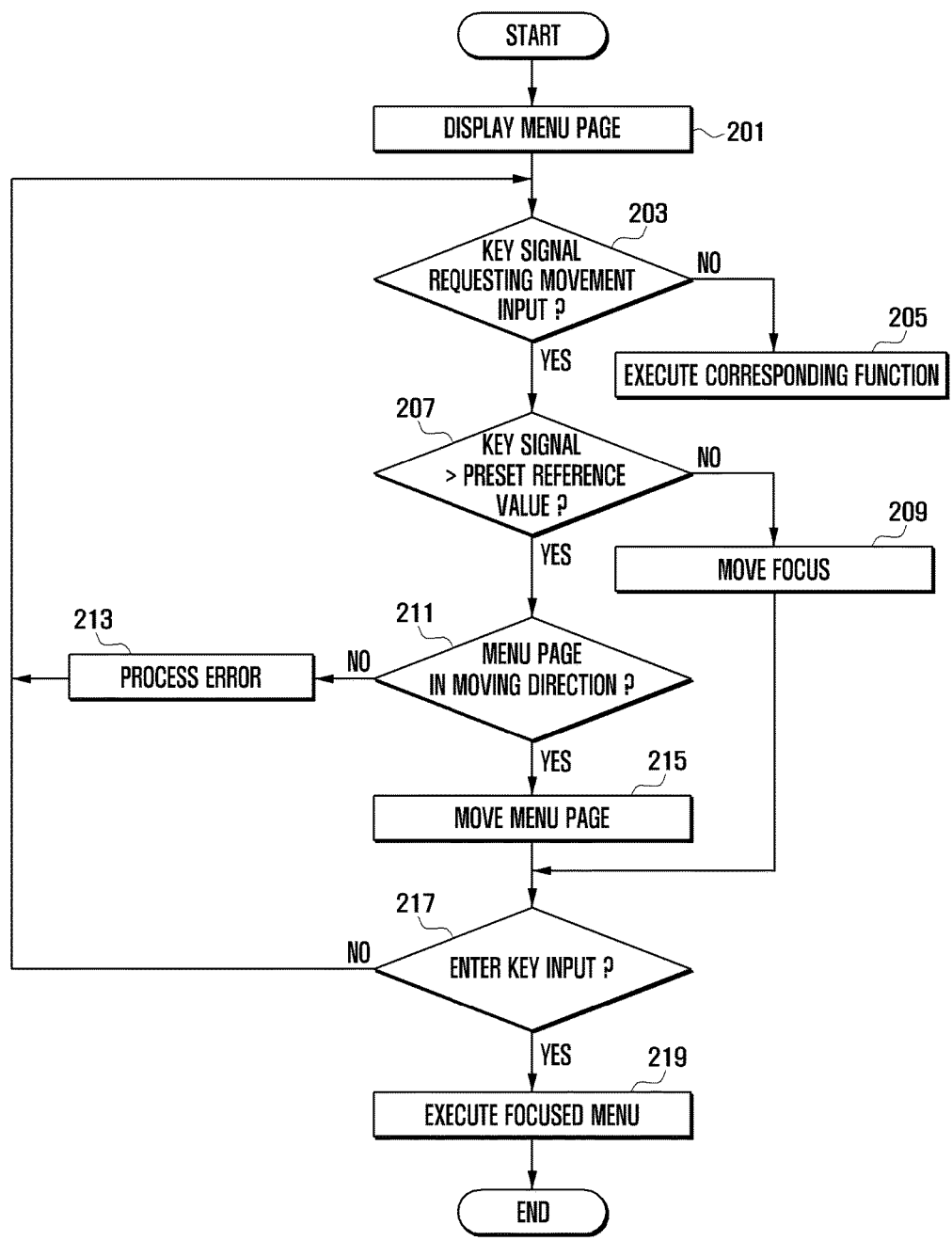
FIG. 2 is a flowchart illustrating a method for providing a user interface in a portable terminal according to an exemplary embodiment of the present invention.
Figure 3:
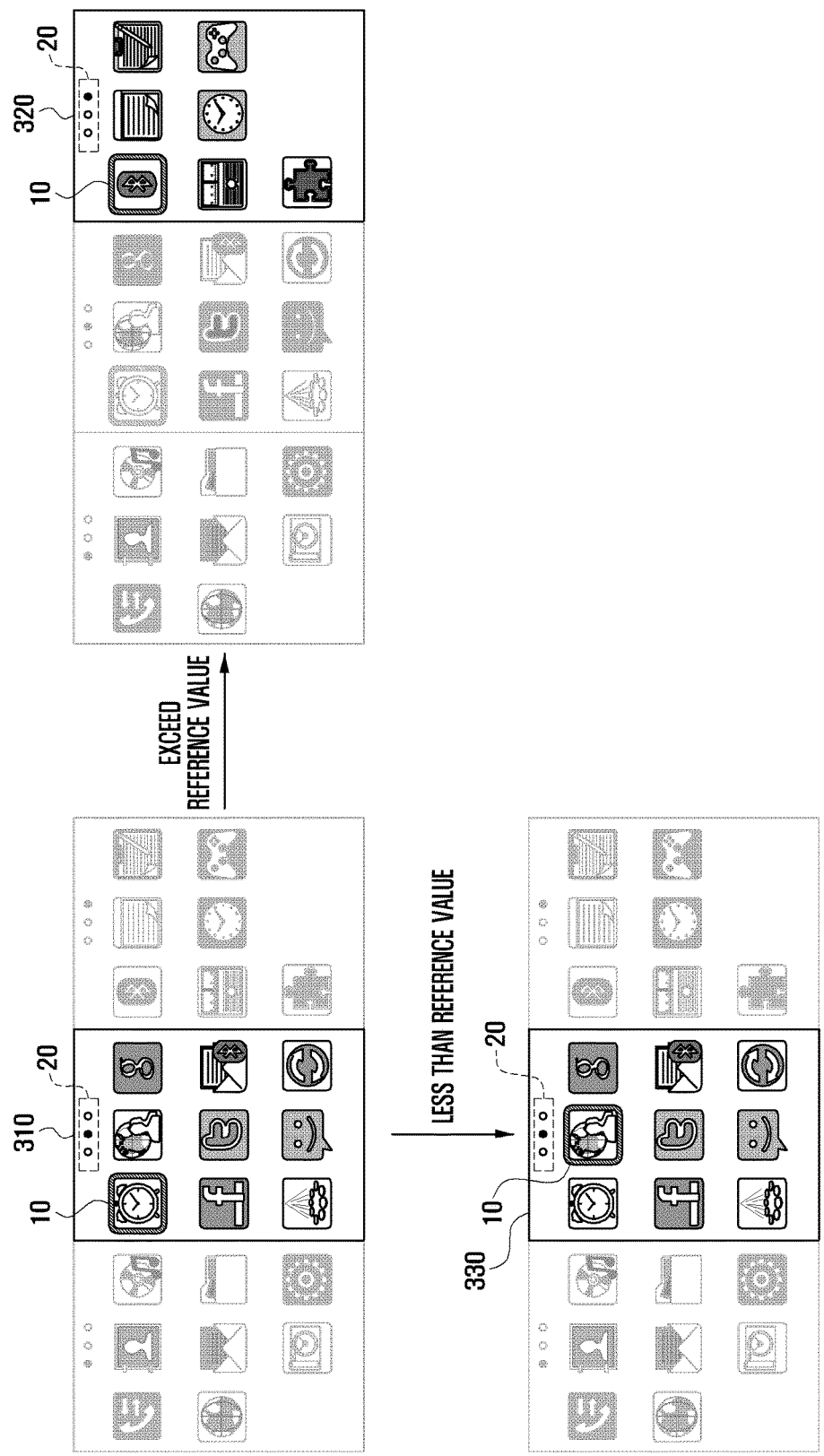
FIG. 3 illustrates screens displayed during a method for providing a user interface in a portable terminal according to an exemplary embodiment of the present invention.

FIG. 2 is a flowchart illustrating a method for providing a user interface in a portable terminal according to an exemplary embodiment of the present invention. FIG. 3 illustrates screens displayed during a method for providing a user interface in a portable terminal according to an exemplary embodiment of the present invention.

Referring to FIG. 1 to FIG. 3, a controller 110 may control to display one of a plurality of menu pages in step 201. As shown in FIG. 3, a plurality of icons linked to a specific function may be arranged in multiple columns and rows on the menu page. The menu page may be set to an idle screen of the portable terminal 100 to be output in an idle state. When there is a separate idle screen, the menu page may be output based on the input of a menu key. The menu page may be edited by a user. For example, the user may change locations of icons, delete, register, and change the icons on the menu page, and the like.

Although FIG. 3 shows that there are three menu pages, the present invention is not limited thereto. For example, at least two menu pages may be set but the number of the menu pages may be changed by a user. As illustrated previously, to inform the user that there are a plurality of menu pages, the display unit 130 may output an image 20 indicating a total number of pages and a current location of the menu page at a top of the menu page as shown by reference numeral 310 of FIG. 3. More particularly, as illustrated by reference numeral 310, the controller 110 may output a number of circles corresponding to the total number of menu pages in a line, and differently output a color of a circle corresponding to a current menu page output on the display unit 130. Menu pages that are dimly shown in FIG. 3 are to indicate that there are a plurality of menu pages other than the menu page currently output on the display unit 130 of the portable terminal 100.

The controller 110 may determine whether a key signal requesting movement is input while the menu page is output in step 203. The key signal may be input by one of a key pad (an arrow key or a volume key), a ball joystick, an optical joystick, a wheel key, and the like. When it is determined in step 203 that the key signal is not input, the controller 110 may execute a corresponding function in step 205. For example, the controller 110 may delete, register, and change icons according to a user request. Conversely, if it is determined in step 203 that the key signal is input, the controller 110 may determine whether the key signal exceeds a preset reference value in step 207. As described earlier, when the key signal is input through a button type keypad (arrow key, volume key), the reference value may be a time period of the key input signal. When the key signal is input through an optical joystick, a ball joystick, or a wheel key, the reference value may be a velocity. When the key signal is input from a button type keypad, the controller 110 determines whether the key signal exceeds a preset reference time period. When the key signal is input through the optical joystick, the ball joystick, or the wheel key, the controller 110 may determine the moving speed (scroll speed) of the ball, joystick, or the wheel key and determine whether the moving velocity exceeds a preset reference velocity.

When it is determined in step 207 that the key signal does not exceed the preset reference value, the controller 110 may move a focus 10 for indicating an icon selected on a menu page to a direction corresponding to the key signal in step 209, and go to step 217. For example, when a right arrow key signal does not exceed the reference value in a screen state of reference numeral 310, the controller 110 may move the focus 10 to an icon to the right of the current focus as shown by reference numeral 330.

When it is determined in step 207 that the key signal exceeds the reference value, the controller 110 may determine whether there is a menu page in a direction of the input key in step 211. When there are no additional menu pages, the controller 110 processes an error in step 213 and returns to step 203. For example, the controller 110 may output a pop-up window indicating that there are no other menu pages on the display unit 130 or output an error sound effect through a speaker of the audio processor 160. Meanwhile, the controller 110 may illustrate an animation effect in which a final menu page is removed and returned. On the other hand, when there is a menu page in the direction of the input key, the controller 110 may move to the next menu page in the direction corresponding to the direction of the input key in step 215. For example, when the right arrow key exceeds the reference value in a state of a screen of reference numeral 310, the controller 110 may move a currently displayed menu page to the left and control the display unit 130 to output a next menu page as illustrated by reference numeral 320. In this case, although not shown, the controller 110 may maintain a previous location of a focus 10 or initialize it to a preset location at the time of moving the menu page. For example, when the menu page is moved with the focus 10 being located in the second column and row, the controller 110 may maintain a location of the focus 10 in the second column and row or initialize it in the first column and row. In an exemplary implementation, when there is a menu in a previous location of the focus during movement of a menu page, the controller 110 maintains a location of the focus 10. Conversely, when there is no menu at the previous location of the focus 10, the controller 110 may initialize a location of the focus 10.

Subsequently, the controller 110 may determine whether an enter key is input in step 217. If the enter key is not input, the controller 110 may return to step 203 and repeat the foregoing procedures. Conversely, when the enter key is input, the controller 110 may execute the focused menu in step 219. If a function corresponding to the executed menu is terminated, the controller 110 may return to step 201 and repeat the foregoing procedures.

Exemplary embodiments of the present invention mentioned above may provide menus in a page scheme capable of intuitively using menus in a non-touch portable terminal without a touch screen. Accordingly, exemplary embodiments of the present invention may improve the convenience of a user in using the menu in the non-touch portable terminal.

Meanwhile, a method for providing a user interface in a portable terminal according to an exemplary embodiment of the present invention as described above may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used.

The computer readable recording medium may include Magnetic Media such as a hard disk, a floppy disk, or magnetic tape, Optical Media such as a Compact Disc Read Only Memory (CD-ROM) or a Digital Versatile Disc (DVD), Magneto-Optical Media such as a floptical disk, and a hardware device such as ROM, Random Access Memory (RAM), and flash memory for storing and executing program commands. Further, the program command may include a machine language code created by a complier and a high-level language code executable by a computer using an interpreter. The foregoing hardware device may be configured to be operated as at least one software module to perform an operation of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, the present invention mentioned above is shown and described with reference to a non-touch portable terminal. However, the present invention may be applied to a portable terminal having a touch-screen. Specifically, the portable terminal having the touch-screen may output a virtual keypad when a list screen is output. The portable terminal having a touch-screen, when the virtual keypad is touched, moves items of the list to a direction corresponding to the touched keypad, one by one. On the other hand, the portable terminal having the touch-screen, when the virtual keypad is long-touched, moves items of the list to a direction corresponding to the long-touched keypad, in unit of items displayed on one screen (as many number of items displayed on one screen).

What is claimed is:

1. A method for providing a user interface in a portable terminal, the method comprising:
    outputting one of a plurality of menu pages, each menu page including a plurality of icons respectively linked to a specific function and arranged in multiple columns and rows;
    determining whether a key signal requesting movement is input;
    determining whether the input key signal exceeds a preset reference value when the key signal is input; and
    moving to another of the plurality of menu pages when the input key signal exceeds the preset reference value, and moving a focus on the output menu page when the input key signal does not exceed the preset reference value.

2. The method of claim 1, wherein the moving to the other of the plurality of menu pages comprises:
    determining a moving direction of the key signal and determining whether there is a menu page in the moving direction; and
    outputting a next menu page when there is the menu page in the moving direction, and processing an error when there is no menu page in the moving direction.

3. The method of claim 2, wherein the processing of the error comprises at least one of outputting a pop-up window or outputting a sound effect indicating an error.

4. The method of claim 2, wherein the processing of the error comprises outputting an animation effect in which a final menu page is removed and returned.

5. The method of claim 1, wherein the key signal is generated by one of a keypad, an optical joystick, a ball joystick, a wheel key, or a virtual keypad of a touch-screen.

6. The method of claim 5, wherein the keypad comprises at least one of an arrow key or a volume key.

7. The method of claim 5, wherein the reference value comprises a key input time period when the key signal is generated by the keypad.

8. The method of claim 5, wherein the reference value comprises a velocity when the key signal is generated by one of the optical joystick, the ball joystick, or the wheel key.

9. The method of claim 1, wherein the moving to the other of the plurality of menu pages comprises maintaining a previous location of the focus after the movement to the other menu page.

10. The method of claim 1, wherein the moving to the other of the plurality of menu pages comprises initializing a location of the focus to a preset location.

11. The method of claim 1, further comprising executing a function corresponding to a location of the focus when an enter key signal is input.

12. An apparatus for providing a user interface in a portable terminal, the apparatus comprising:
    a display unit configured to output one of a plurality of menu pages, each menu page including a plurality of icons respectively linked to a specific function and arranged in multiple columns and rows;
    an input unit configured to input a key signal requesting movement; and
    a controller configured to:
        determine whether the input key signal exceeds a preset reference value when the key signal is input from the input unit, move, to another of the plurality of menu pages, when the input key signal exceeds the preset reference value, and move a focus on the output menu page when the input key signal does not exceed the preset reference value.

13. The apparatus of claim 12, wherein the controller is further configured to:

determine a moving direction of the key signal, determine whether there is a menu page in the moving direction when the key signal exceeds the reference value, output a next menu page when there is the menu page in the moving direction, and process an error when there is no menu page in the moving direction.

14. The apparatus of claim 13, wherein the controller is further configured to process the error by at least one of outputting a pop-up window or outputting a sound effect indicating an error.

15. The apparatus of claim 13, wherein the controller is further configured to process the error by outputting an animation effect in which a final menu page is removed and returned.

16. The apparatus of claim 12, wherein the key signal comprises one of a keypad, an optical joystick, a ball joystick, a wheel key, or a virtual keypad of a touch-screen.

17. The apparatus of claim 16, wherein the keypad comprises at least one of an arrow key or a volume key.

18. The apparatus of claim 16, wherein the reference value comprises a key input time period when the key signal is generated by the keypad.

19. The apparatus of claim 16, wherein the reference value comprises a velocity when the key signal is generated by one of the optical joystick, the ball joystick, or the wheel key.

20. The method of claim 12, wherein the controller is further configured to:

maintain a previous location of the focus after the movement to the other menu page, or initialize a location of the focus to a preset location.

21. The apparatus of claim 12, wherein the controller is further configured to execute a function corresponding to a location of the focus when an enter key signal is input.

* * * * *